United States Patent
Vaughan

(10) Patent No.: US 8,049,092 B1
(45) Date of Patent: Nov. 1, 2011

(54) GRAND STAFF TO KEYBOARD ASSOCIATION METHOD AND SYSTEM

(76) Inventor: David Vaughan, Grass Valley, CA (US)

( * ) Notice: Subject to any disclaimer, the term of this patent is extended or adjusted under 35 U.S.C. 154(b) by 365 days.

(21) Appl. No.: 12/126,723

(22) Filed: May 23, 2008

(51) Int. Cl.
*G09B 15/00* (2006.01)
(52) U.S. Cl. .................................................. 84/470 R
(58) Field of Classification Search ............... 84/423 R, 84/433, 438, 470 R, 478
See application file for complete search history.

(56) References Cited

U.S. PATENT DOCUMENTS

| | | | |
|---|---|---|---|
| 2,897,712 A | 8/1959 | Merchant |
| 3,339,447 A | 9/1967 | Curry |
| 3,415,152 A | 12/1968 | Gullickson |
| 3,460,424 A | 8/1969 | Tepper |
| 3,552,256 A | 1/1971 | Soanes |
| 3,610,086 A | 10/1971 | Decker |
| 3,720,128 A | 3/1973 | Frank |
| 3,744,366 A | 7/1973 | Castillo |
| 3,784,717 A | 1/1974 | Okamoto |
| 3,823,637 A | 7/1974 | Scott |
| 3,827,330 A | 8/1974 | Ward |
| 3,837,256 A | 9/1974 | Gullickson |
| 3,854,370 A | 12/1974 | Sapinski |
| 3,881,390 A | 5/1975 | Gullickson |
| 3,895,555 A | 7/1975 | Peterson |
| 3,958,487 A | 5/1976 | Goldman |
| 4,040,324 A | 8/1977 | Green |
| 4,061,072 A | 12/1977 | Del Castillo |
| 4,378,720 A | 4/1983 | Nakada |
| 4,406,208 A | 9/1983 | Nazer |
| 4,694,723 A | 9/1987 | Shinohara |
| 5,040,447 A | 8/1991 | Murata |
| 5,107,743 A | 4/1992 | Decker |
| 5,252,772 A | 10/1993 | Wright |
| 5,266,735 A | 11/1993 | Shaffer |
| 5,394,784 A | 3/1995 | Pierce |
| 5,546,843 A | 8/1996 | Degaard |
| 5,576,505 A | 11/1996 | Linhart |
| 6,008,551 A | 12/1999 | Coray |
| 6,037,534 A | 3/2000 | Yasutoshi |
| 6,284,961 B1 * | 9/2001 | Kimmel, Jr. ................ 84/478 |
| 7,005,569 B2 | 2/2006 | Feidner |
| 2002/0029681 A1 | 3/2002 | Manning |
| 2002/0134216 A1 * | 9/2002 | Shibukawa ................ 84/477 R |
| 2005/0183567 A1 | 8/2005 | Aoki |

FOREIGN PATENT DOCUMENTS

WO  WO 2009031162 A2 *  3/2009

\* cited by examiner

*Primary Examiner* — Kimberly Lockett
(74) *Attorney, Agent, or Firm* — William Bodnar

(57) ABSTRACT

A method and system is provided which facilitates the process of the learning music reading related to the playing of keyboard instruments through associating the staff lines on the bass and treble clefs with the ten corresponding keys on a keyboard by marking those keys.

15 Claims, 2 Drawing Sheets

GRAND STAFF TO KEYBOARD ASSOCIATION METHOD AND SYSTEM

CROSS REFERENCE TO RELATED APPLICATIONS

None.

FIELD OF THE INVENTION

The present invention relates to the science and art of teaching music score reading in conjunction with the playing of musical instruments. More particularly, my invention relates to an efficient system of identifying the keys of a keyboard that correspond to the lines of the bass and treble clef key signatures. The use of this system can enable a user to learn the rudiments of music score reading and the application of the same to keyboard instrument playing.

BACKGROUND OF THE INVENTION

Keyboard musical instruments generally have a surface comprising keys each corresponding to a musical note or tone and which are pressed or otherwise actuated in order to sound or "play" the notes assigned to the respective keys. Such instruments produce sounds in various ways and are embodied in such well known keyboard instruments as pianos, organs, harpsichords, synthesizers (digital keyboards), and accordions.

Another type of keyboard instrument is the xylophone, a musical instrument of the percussive family. The xylophone consists of wooden bars of various lengths that are struck by plastic, wooden, or rubber mallets to produce sound. The vibraphone and other similar instruments of the percussive family can also be considered keyboard instruments.

Keys on keyboard instruments typically produce a sound when depressed or contacted. These sounds can be produced by mechanical or electronic means or a combination of the two. As used herein, a "key" is intended broadly to mean all types of levers including conventional piano keys, as well as other actuation devices as applied to xylophones and vibraphones and similar percussive instruments.

Sheet music for keyboard instruments is typically notated on what is commonly referred to as the great or grand staff. The grand staff is comprised of a bass clef and a treble clef. The five lines on the bass clef correlate to five notes of distinct pitches. The notes represented by the lines of the bass clef and their corresponding pitch frequencies in hertz (Hz) are as follows: G (97.999), B (123.471), D (146.892), F (174.614), and A (220.000). The notes represented by the five lines of the treble clef and their corresponding pitch frequencies are: E (329.628), G (391.995), B (493.883), D (587.330), and F (698.456).

In Western music, the expression "middle C" refers to the note "C" located exactly between the two staves of the grand staff. The piano key corresponding to "middle C" also tends to be in the middle of a keyboard. When calculated in equal temperament with a reference of A above middle C as 440 Hz, the frequency of the middle C note is approximately 261.626 Hz.

A problem associated with conventional approaches to the teaching of reading of music (musical scores) and applying what one reads simultaneously to musical instruments, and to the keyboard in particular, is that the teaching of it at the elementary level has been focused on the recognition and naming of notes in a discrete manner. An elementary learner must read a note on the grand staff and translate that note to a letter name (E, G, B, etc.) That note is then processed and transferred to an appropriate key on the keyboard that the player activates.

Thus, in conventional keyboard instructional methodologies, one initially learns music notation by letter name, the location of each musical note on the instrument by that letter name, and the theory that ties these methods together in the naming of notes rather than intuitive placement of the beginning player's fingers on the keys.

Others have developed less conventional means to simplify the learning process by marking the keys of the keyboard with the corresponding note and/or letter symbols. These attempts can actually make the process more complex and result in additional processing of musical notation or symbols (directly on the keyboard). As a result, these conventional (and quasi-conventional) reference techniques frequently do little to advance a student's mastery of the keyboard and understanding of basic musical notation as it relates to the keyboard.

SUMMARY OF THE INVENTION

Conventional teaching methods for beginning keyboard students are essentially note/scale (alphabetical) memorization-driven processes which tend to obscure the path toward proper musical development to the point where such methods seem chaotic and illogical. The solution to the problem according to my invention as it applies to keyboard playing is a system utilized for teaching beginners (and others), the instructional basis of which is grounded upon the development of an understanding of the correlation between the keys that correspond to the notes represented by the lines of the grand staff.

BRIEF DESCRIPTION OF DRAWINGS

The character of the invention can be further understood by reference to one of its structural forms, as illustrated by the accompanying drawings, in which.

DETAILED DESCRIPTION OF THE PREFERRED EMBODIMENTS

Figure 1:
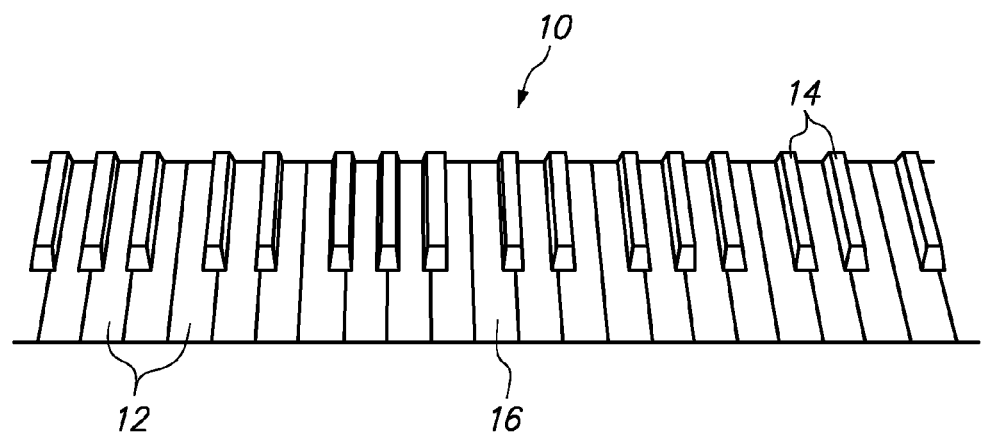
FIG. 1 is an illustration of a standard piano keyboard.
Figure 2:
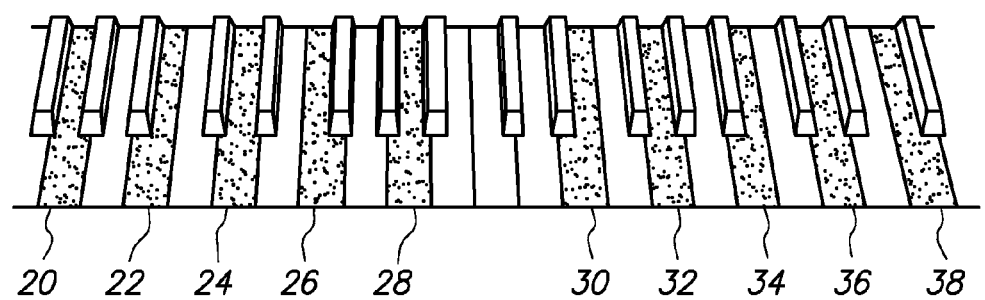
FIG. 2 is a perspective view of a keyboard showing the marked keys that correspond to the lines of the bass and treble clefs.

Referring to FIG. 1, which shows part of a keyboard of the type found on most pianos, harpsichords, synthesizers and accordions, the white keys 10 and black keys 12, when depressed, produce distinct tones. The key associated with "middle C" 16 is also shown. FIG. 2 shows the general features of a preferred embodiment of the present invention with "middle C" 16 as a reference point.

Figure 3:
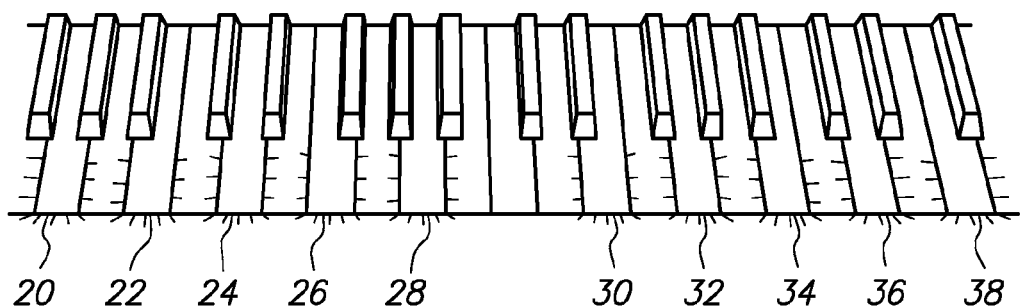
FIG. 3 is a perspective view of a keyboard showing the lighted or illuminated keys that correspond to the lines of the bass and treble clef.
Figure 4:
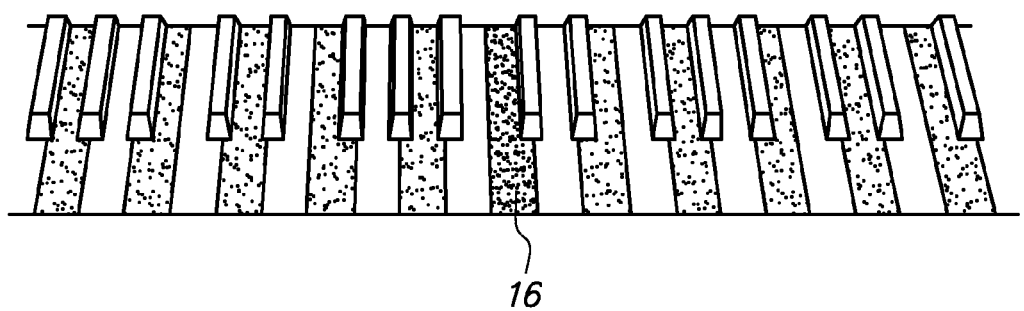
FIG. 4 is a perspective view of a keyboard showing the marked keys that correspond to the lines of the bass and treble clefs along with one other marked key that corresponds to a bass or treble clef ledger line.

In one embodiment of the method of my invention, and with references to FIG. 2 and FIG. 3, the student is taught at the keyboard to identify the marked keys 20-28 to the left of "middle C" as the keys that correspond to the notes associated with the staff lines of the bass clef. These notes are G, B, D, F and A.

The marked keys 30-38 to the right of "middle C" are the keys that correspond to the notes associated with the staff lines of the treble clef. These notes are E, G, B, D and F. Thus, ten distinct notes (corresponding to ten distinct keys) are represented by the staff lines of the bass and treble clefs. Ledger lines are short lines used as notation for extending the range above or below the staff.

The system shown and described benefits the untrained musician in several ways. In visually differentiating the keys that correspond to the notes represented by the five lines of the bass and treble clef, a learner can recognize the direct communication of the key to corresponding staff (or ledger) line note. This eliminates the need to translate the note on a musical score to a letter and then correlate that letter (and note) to a corresponding key on the keyboard. Thus this direct communication of a ledger line note to a key enhances the learning process.

CONCLUSIONS, OTHER EMBODIMENTS, AND SCOPE OF INVENTION

The keys that are associated with the lines of the grand staff can be visually differentiated from the other keyboard keys by various methods. Typically there are white and black keys on a standard keyboard. Optimally, the differentiation will easily allow the keyboard user to visually distinguish the designated keys.

Two of the ways that designated keys can be differentiated involve marking the surface of the key via 1) electronic or 2) physical, non-electronic means. An example of physical, non-electronic marking would be to shade the key surface so it is distinguished from the other keys. Typical keyboard keys are white or black. One method of marking through shading involves the use of grayscale. Grayscale is the use of many shades of gray from white (0%) to black (100%).

Assuming that the white keys represent approximately 0% on the grayscale range and the black keys represent approximately 100%, marking the keys through grayscale shading will be more effective with grayscale ranges of between 1% and 80%. This will allow a user to quickly distinguish the marked keys.

Another form of marking could be accomplished by coloring the keys. Coloring may make the marked keys more discernible for certain users. The bass clef and treble clef keys can be marked with the same color or different colors could be utilized. It is also contemplated that different shades of coloring could be used. In essence, the term marking can include any method of physically distinguishing the keys including, but not limited to, shading, coloring, hatching or similar means.

The keys could also be differentiated by electronic marking using either internal or external lighting or both. One example of an external light source could be a lamp of series of lamps that shine a light on the designated keys. LED lights are another example of external light sources. An external light source can be defined as any light that illuminates the keys from outside the surface of the keys.

An internal light source can be defined as any light that illuminates the keys from below or within the keys. LEDs built into the keys provide an example of an internal light source. It is also contemplated that the keys could be differentiated by electronic marking using a combination of external and internal light sources. Any visually discernible light color produced by the external and internal light sources can be utilized.

Although the notes of the bass and treble clef have been defined in terms of pitch frequencies, these specific pitch frequencies are not to be construed as limiting. It is contemplated that a keyboard could have the keys that correspond to the notes of the bass and treble clef but actually produce notes or sounds that have different pitches outside of the 98 Hz to 699 Hz range specified previously. Another embodiment could have keys that correspond to the bass and treble clef but actually produce notes or sounds with pitches that are one or two three octaves above or below the standard pitch frequencies described herein. Smaller or partial keyboards could utilize keys that produce notes in various ranges depending on the instrument's mechanics, electronics or both.

This system was developed with an understanding that the association of the notes on the staff lines of the grand staff to the keyboard keys is a fundamental step in learning to read music applicable to keyboard instruments. Elimination of 1) translation of the musical symbol to a letter and 2) further translation of that letter to a key can result in a quicker learning curve.

Although the foregoing description contains specifics, they should not be construed as limiting the scope of my invention, but rather as merely providing non-limiting illustrations of some of the currently preferred embodiments of the invention as defined in the following claims.

Glossary:

The Applicant intends to act as his own lexicographer in the Present Application. The definitions of following terms supersedes the plain and ordinary meanings of those terms Staff lines—In musical notation the staff is a set of five horizontal lines and four spaces, on which note symbols are placed to indicate their pitch. The staff lines are the five horizontal lines on the staff.

A ledger line is musical notation to inscribe notes outside the lines and spaces of the regular musical staffs.

A clef is a musical symbol used to indicate the pitch of written notes. Placed on one of the lines at the beginning of the staff, it indicates the name and pitch of the notes on that line. This line serves as a reference point by which the names of the notes on any other line or space of the staff may be determined.

When the G-clef is placed on the second line of the staff, it is called the "treble clef". This is by far the most common clef used today.

When the F-clef is placed on the fourth line, it is called the "bass clef". This is the only F-clef used today.

Shading—depicting coloring within a range from 0-100% luminance. Shading as used in the Present Application is not meant to be limited to shades of gray (varying from black to white), but may also include other colors having varying luminance.

Grayscale—a shading metric denoting luminance as a percent of maximum.

I claim:

1. A method to facilitate learning music applicable to a musical score of notes with five staff lines representing a bass clef and five staff lines representing a treble clef and a musical instrument comprising a keyboard, said method comprising:

marking ten keys on the keyboard, said ten keys consisting of:

a) keys that produce the notes represented by the five staff lines of the bass clef and b) keys that produce the notes represented by the five staff lines of the treble clef, said marking of a substantially uniform nature, wherein said keys are marked through non-electronic mechanisms, and said non-electronic mechanisms cause marking of the ten keys by shading said keys.

2. The method of claim 1 wherein said shading produces a grayscale shading of from 1% to 80%.

3. A system for facilitating learning music applicable to a musical score of notes with five staff lines representing a bass clef and five staff lines representing a treble clef and a musical instrument comprising a keyboard, said system comprising:
- a means for marking ten keys on the keyboard, said ten keys consisting of:
  - a) keys that produce the notes represented by the five staff lines of the bass clef and
  - b) keys that produce the notes represented by the five staff lines of the treble clef,
- said means for marking not including the use of numbers or letters;
- wherein said means for marking comprises non-electronic mechanisms; and
- said means for marking marks the ten keys by shading said keys.

4. The system of claim 3 wherein said shading produces a grayscale shading of from 1% to 80%.

5. The system of claim 3 further comprising an additional means for marking at least one additional key on a keyboard, said at least one additional key comprising a key that produces a musical tone represented by a note denoted by a ledger line below or above the bass or treble clef staff lines.

6. A system for facilitating learning music applicable to a musical score of notes with five staff lines representing a bass clef and five staff lines representing a treble clef and a musical instrument comprising a keyboard, said system comprising:
- markers for ten keys on the keyboard, said ten keys consisting of:
  - a) keys that produce the notes represented by the five staff lines of the bass clef and
  - b) keys that produce the notes represented by the five staff lines of the treble clef,
- said markers having markings that are substantially uniform and
- wherein said markers mark the ten keys by shading said keys.

7. The system of claim 6 wherein said shading produces a grayscale shading of from 1% to 80%.

8. A musical instrument comprising a keyboard wherein said instrument facilitates learning music using a musical score of notes with five staff lines representing a bass clef and five staff lines representing a treble clef, said musical instrument further comprising:
- markers for ten keys on the keyboard, said ten keys consisting of:
  - a) keys that produce the notes represented by the five staff lines of the bass clef and
  - b) keys that produce the notes represented by the five staff lines of the treble clef,
- said markers having markings that are substantially uniform.

9. The musical instrument of claim 8 wherein said markers comprise electronic lighting.

10. The musical instrument of claim 9 wherein the markers are internal to the musical instrument.

11. The musical instrument of claim 9 wherein the markers are external to the musical instrument.

12. The musical instrument of claim 8 wherein said markers comprise non-electronic mechanisms.

13. The musical instrument of claim 8 further comprising an additional at least one marker that marks at least one additional key on a keyboard, said at least one additional key comprising a key that produces a musical tone represented by a note on a ledger line below or above the bass or treble clef staff lines.

14. A musical instrument comprising a keyboard wherein said instrument facilitates learning music using a musical score of notes with five staff lines representing a bass clef and five staff lines representing a treble clef, said musical instrument further comprising:
- markers for ten keys on the keyboard, said ten keys consisting of:
  - a) keys that produce the notes represented by the five staff lines of the bass clef and
  - b) keys that produce the notes represented by the five staff lines of the treble clef,
- said markers not having letters or numbers thereon;
- wherein said markers comprise non-electronic mechanisms; and
- said markers mark the ten keys by shading said keys.

15. The musical instrument of claim 14 wherein said shading produces a grayscale shading of from 1% to 80%.

* * * * *